United States Patent
Daniels et al.

(10) Patent No.: US 10,493,554 B2
(45) Date of Patent: Dec. 3, 2019

(54) ERGONOMIC WELDING TORCH HANDLE WITH INTERCHANGEABLE GRIPS

(71) Applicant: Victor Equipment Company, Denton, TX (US)

(72) Inventors: Jonathan A. Daniels, Denton, TX (US); Glenn Redding, Flower Mound, TX (US); Ross Fleischmann, Denton, TX (US)

(73) Assignee: Victor Equipment Company, Denton, TX (US)

( * ) Notice: Subject to any disclaimer, the term of this patent is extended or adjusted under 35 U.S.C. 154(b) by 303 days.

(21) Appl. No.: 15/459,541

(22) Filed: Mar. 15, 2017

(65) Prior Publication Data

US 2017/0182582 A1 Jun. 29, 2017

Related U.S. Application Data

(63) Continuation of application No. PCT/US2015/051384, filed on Sep. 22, 2015.

(60) Provisional application No. 62/053,782, filed on Sep. 22, 2014.

(51) Int. Cl.
*B23K 9/10* (2006.01)
*B23K 9/32* (2006.01)
*B23K 9/173* (2006.01)
*B23K 9/28* (2006.01)
*B23K 9/29* (2006.01)

(52) U.S. Cl.
CPC .............. *B23K 9/32* (2013.01); *B23K 9/173* (2013.01); *B23K 9/287* (2013.01); *B23K 9/29* (2013.01); *B23K 9/295* (2013.01); *B23K 9/323* (2013.01)

(58) Field of Classification Search
CPC .......... B23K 9/173; B23K 9/287; B23K 9/29; B23K 9/295; B23K 9/32; B23K 9/323
USPC .................. 219/136, 137.2–137.63
See application file for complete search history.

(56) References Cited

U.S. PATENT DOCUMENTS

| 4,554,432 A | 11/1985 | Raloff | |
|---|---|---|---|
| 4,608,482 A * | 8/1986 | Cox | B23K 9/1087 219/130.31 |
| 6,338,290 B1 * | 1/2002 | Lin | B25D 1/12 81/22 |
| 6,822,196 B2 * | 11/2004 | Centner | B23K 9/295 219/137.62 |

(Continued)

FOREIGN PATENT DOCUMENTS

| WO | 03041459 A | 5/2003 |
|---|---|---|
| WO | 03041459 A2 | 5/2003 |

OTHER PUBLICATIONS

Written Opinion of International Searching Authority PCT/US2015/051384 dated Mar. 28, 2017.

(Continued)

*Primary Examiner* — Sang Y Paik
(74) *Attorney, Agent, or Firm* — Edell, Shapiro & Finnan, LLC

(57) ABSTRACT

A handle assembly includes a housing and an interchangeable saddle for customizing a geometrical grip of the handle. In one form, the housing includes an attachment feature and the interchangeable saddle includes a mating attachment feature to allow for the interchangeable saddle to be removably secured to an upper surface of the housing. Each interchangeable saddle defines a customized geometrical grip.

23 Claims, 20 Drawing Sheets

(56) References Cited

U.S. PATENT DOCUMENTS

| | | | |
|---|---|---|---|
| 7,152,511 B2* | 12/2006 | Fen .......................... | B25G 1/00 |
| | | | 81/177.1 |
| 7,770,262 B2* | 8/2010 | Schultz ................... | B25F 5/006 |
| | | | 16/110.1 |
| 2009/0253089 A1 | 10/2009 | Talkington et al. | |
| 2013/0200058 A1* | 8/2013 | Kachline .............. | B23K 9/1056 |
| | | | 219/138 |

OTHER PUBLICATIONS

International Search Report for PCT/US2015/051384 dated Apr. 6, 2016.
International Search Report tin corresponding International Application No. PCT/US2015/051384, dated Apr. 6, 2016.
Office Action for Brazil Patent Application No. BR112017005458-2 dated Aug. 20, 2019, with English translation, 5 pages.

\* cited by examiner

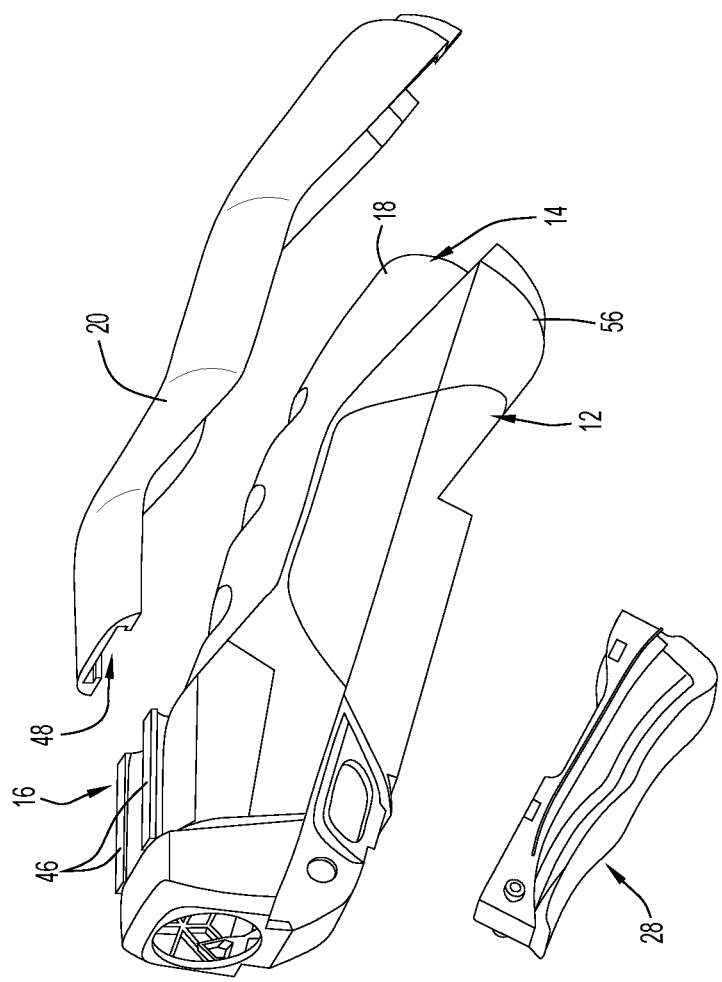
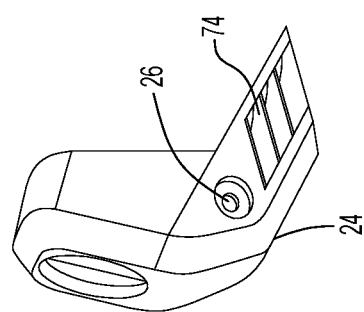
FIG. 3A

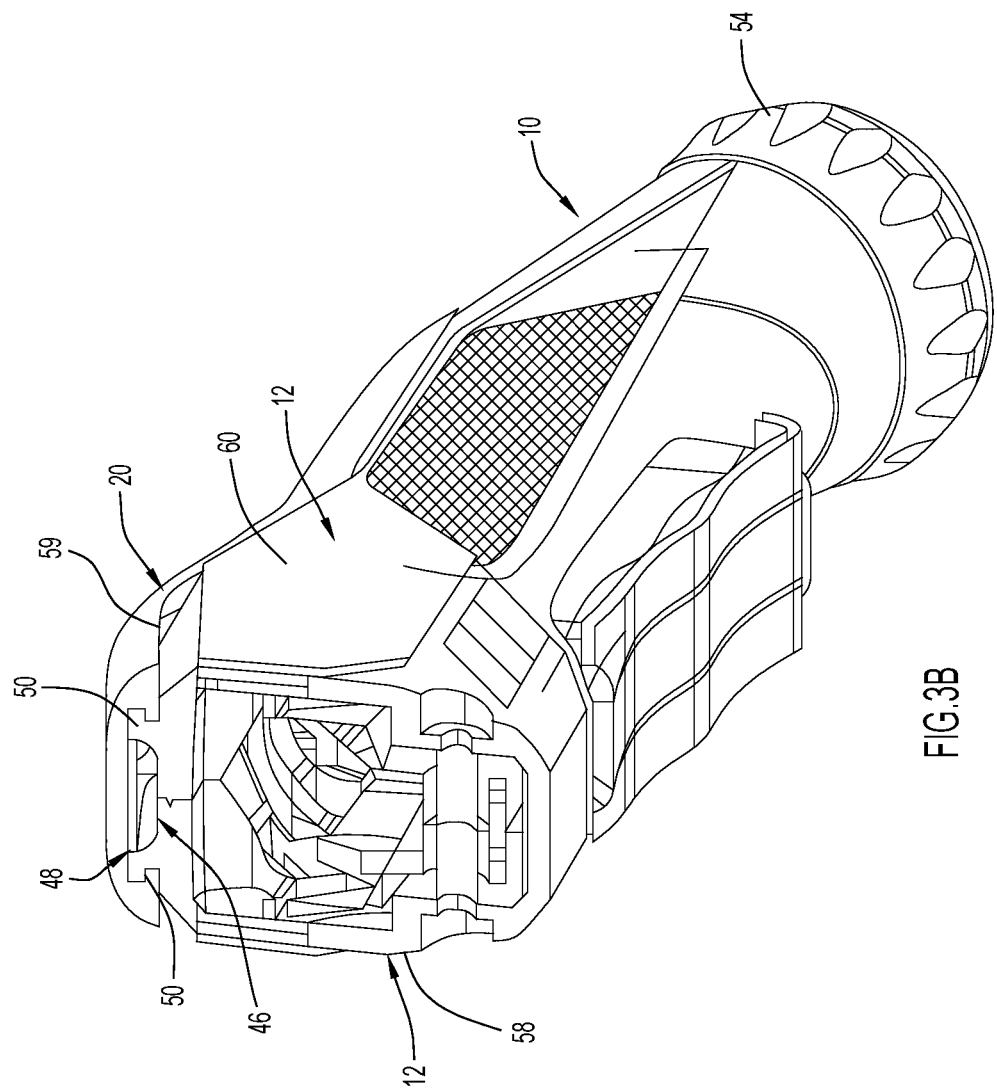

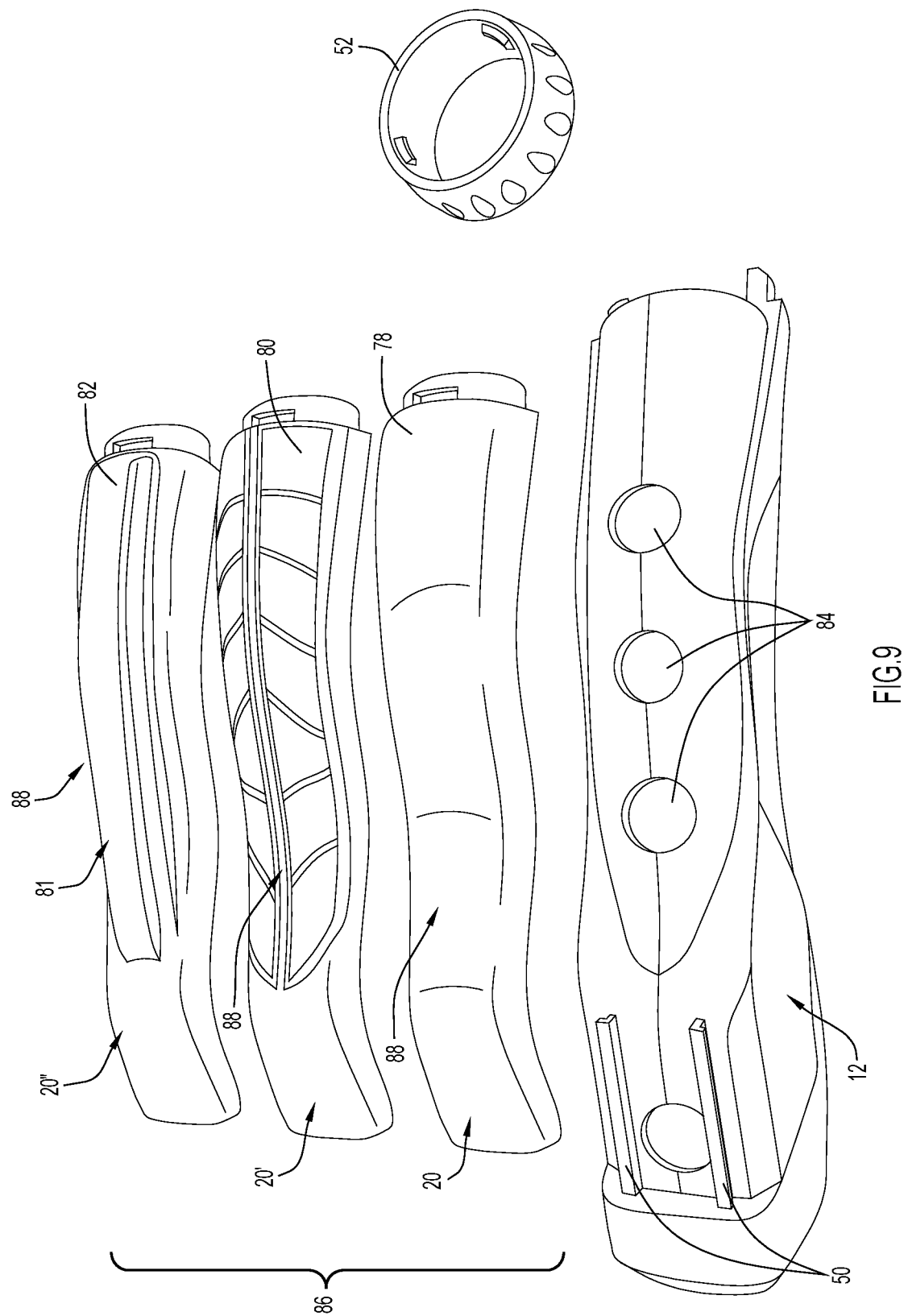

ERGONOMIC WELDING TORCH HANDLE WITH INTERCHANGEABLE GRIPS

CROSS REFERENCE TO RELATED APPLICATIONS

This application is a continuation of International Application No. PCT/US2015/051384, filed on Sep. 22, 2015, which claims the benefit of U.S. Provisional Application No. 62/053,782, filed on Sep. 22, 2014, the entire contents of both of which are hereby incorporated by reference.

FIELD OF THE INVENTION

The present disclosure relates generally to handles for power tools and in particular for a torch used in gas welding/cutting, plasma cutting, or arc welding such as Metal Inert Gas (MIG) or Gas Metal Arc Welding (GMAW) welding torch.

BACKGROUND

The statements in this section merely provide background information related to the present disclosure and may not constitute prior art.

As well known to those skilled in the art, a gas metal arc welding gun typically receives electrical current, a supply of a shielding gas, and a wire electrode via a power cable. The power cable further includes a coaxial gas hose and wire guide located within the gas hose. The supply of the electrical current, the shielding gas, and the electrode wire is controlled by a trigger on the welding torch. By properly holding the welding torch and manipulating the trigger, an electrical arc is created between the free end of the electrode and the workpiece, and the welding operation is shielded from atmospheric contamination by the supplied shielding gas.

In a typical MIG welding torch, a conductor tube is secured to the front end of a welding gun handle and generally functions to conduct both electrical current and shielding gas, and also provides a conduit for feeding welding wire from a supply device (e.g., wire feeder) to the end of the conductor tube. The welding wire is then fed through an assembly of consumable components that are secured to the end of the conductor tube, including a diffuser, a contact tip, and a nozzle. Generally, the diffuser distributes a shield gas within the nozzle and around the welding wire to provide a shielded weld zone, the contact tip guides the welding wire through to the weld zone and also conducts current to the welding wire, and the nozzle houses the consumable components, delivers the shielding gas, and shields the other consumable components from weld spatter. Operation of a typical MIG welding torch, by way of example, is shown and described in U.S. Pat. Nos. 5,491,321 and 5,338,917, which are commonly owned with the present application, and the contents of which are incorporated herein by reference in their entirety.

Handles for arc welding torches generally provide a portion intended for gripping or handling by a user. The handle also includes the trigger that advances the welding wire, along with the shield gas supply, and is typically mechanically fastened around the power lead and various internal connectors. The handle is typically a rigid component intended for grasping and operation by a variety of end-users.

Handling an arc welding torch for extended periods of time can be quite cumbersome to the end-user, and thus improved arc welding torch features that can reduce operator fatigue are often welcomed in the art.

SUMMARY

The present disclosure generally provides an interchangeable saddle that allows for easily modifying a grip of a handle assembly for a torch, such as an arc welding torch, a gas cutting/welding torch, or a plasma cutting torch. The various forms of the present disclosure provide an interchangeable saddle that allows for easy customization and modification of the grip for different end-users.

In one form, a handle assembly for a welding torch is provided that comprises a housing defining a proximal end portion, a distal end portion, and an upper surface extending between the end portions. The handle assembly further includes an interchangeable saddle that is removably secured to the upper surface of the housing for modifying a grip of the handle assembly. Alternately, the interchangeable saddle may be secured to another surface of the housing and is not limited to the upper surface.

In another form, an interchangeable saddle for a torch is provided that comprises at least one mating attachment feature configured to engage a corresponding attachment feature of a handle of a torch. The interchangeable saddle defines a customized geometrical grip.

Further still, the present disclosure provides for a set of interchangeable saddles for a torch. Each saddle comprises at least one mating attachment feature that is configured to engage a corresponding attachment feature of a handle of the torch. Each interchangeable saddle defines a customized geometrical grip.

According to another form of the present disclosure, a welding torch that comprises a handle assembly, a conductor tube extending through the housing, and a trigger secured to the housing and operatively connected to a gas and electrical power supply. The welding torch further includes a lead assembly secured to the conductor tube, which provides a conduit for the gas and electrical power. The handle assembly comprises a housing defining a proximal end portion, a distal end portion and an upper surface extending between the end portions. The handle assembly further includes an interchangeable saddle that is removably secured to the upper surface of the housing for modifying a grip of the handle assembly.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3A is an exploded perspective view of a handle assembly constructed in accordance with the teachings of the present disclosure;

FIG. 3B is a partial perspective view of a handle assembly illustrating an attachment between an interchangeable saddle and housing members and constructed in accordance with the teachings of the present disclosure;

FIG. 9 is a top perspective view of another form of the handle assembly and a set of interchangeable saddles and a locking ring constructed in accordance with the teachings of the present disclosure;

DETAILED DESCRIPTION

Figure 1:
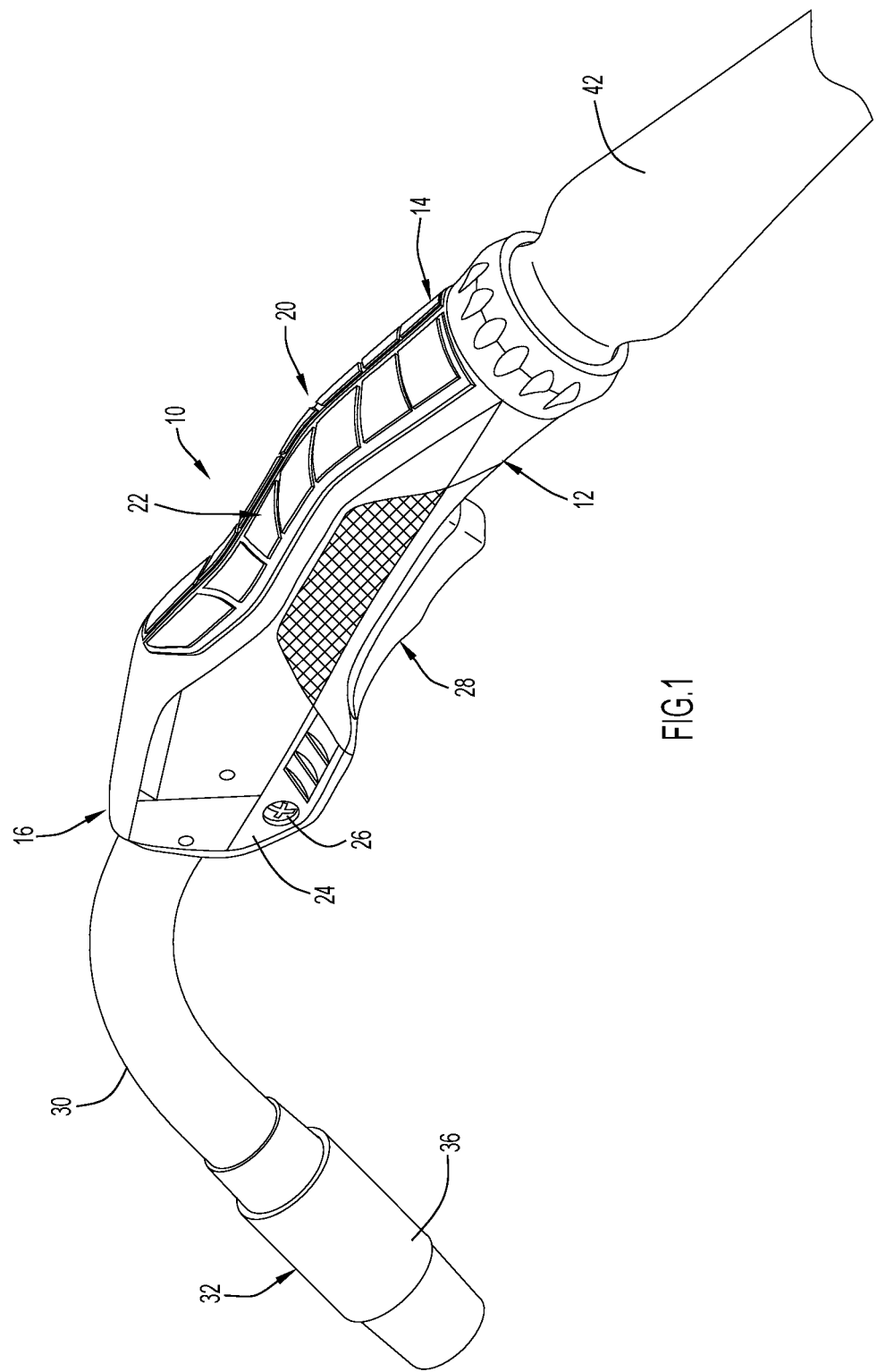
FIG. 1 is a perspective view of a welding torch constructed in accordance with the teachings of the present disclosure.

The following description is merely exemplary in nature and is in no way intended to limit the present disclosure or its application or uses. It should be understood that throughout the description and drawings, corresponding reference numerals indicate like or corresponding parts and features. And although the term "welding torch" or "welding gun" is used throughout the specification, it should be understood that the teachings of the present disclosure may apply to any type of handle for an arc welding torch, a gas welding/cutting torch, a plasma cutting torch, or other user-operated handle for manipulating a welding/cutting apparatus. Accordingly, as used herein, the term "torch" should not be construed as being limited to an arc welding torch.

Figure 2:
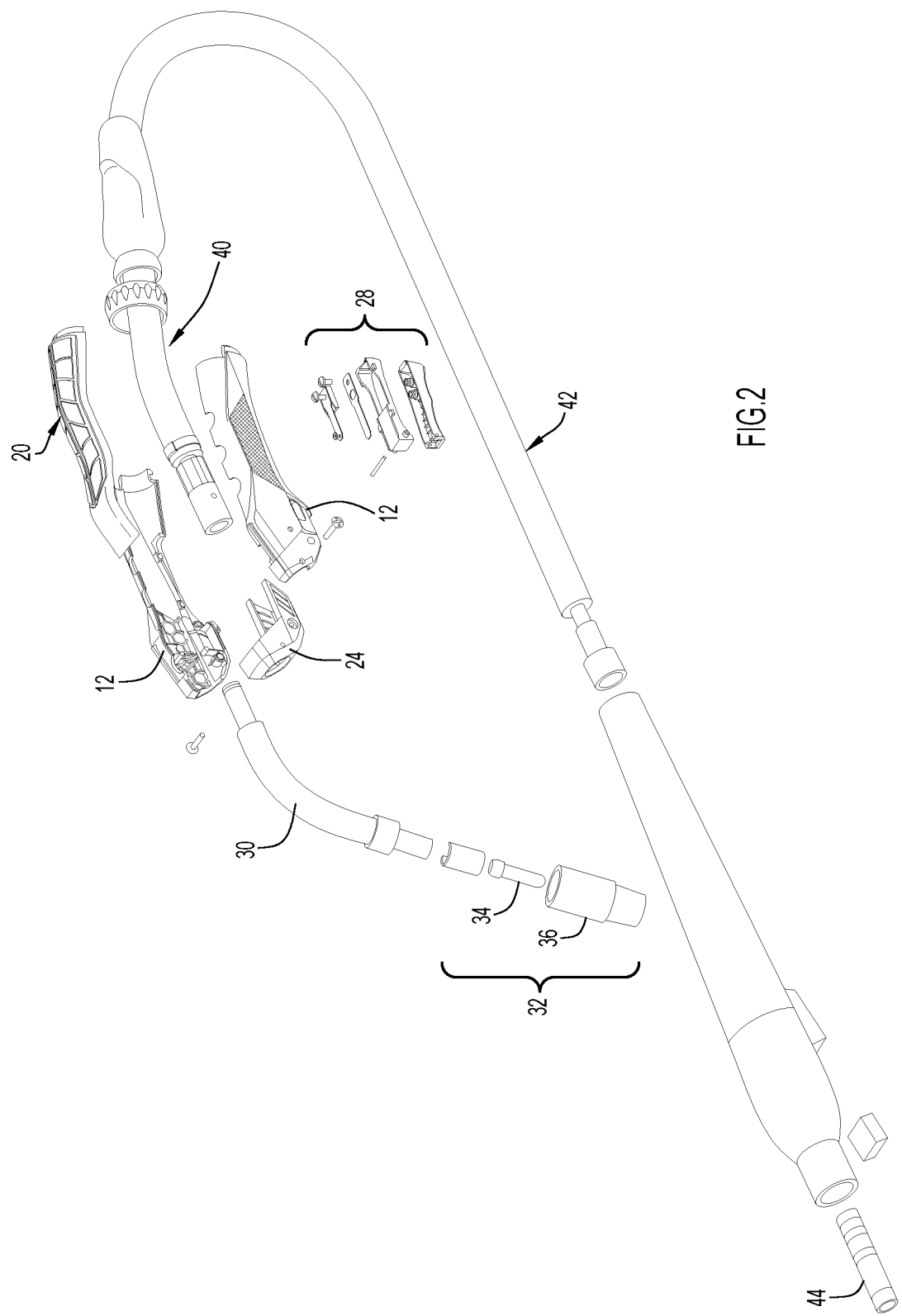
FIG. 2 is an exploded perspective view of the welding torch constructed in accordance with the teachings of the present disclosure.
Figure 4A:
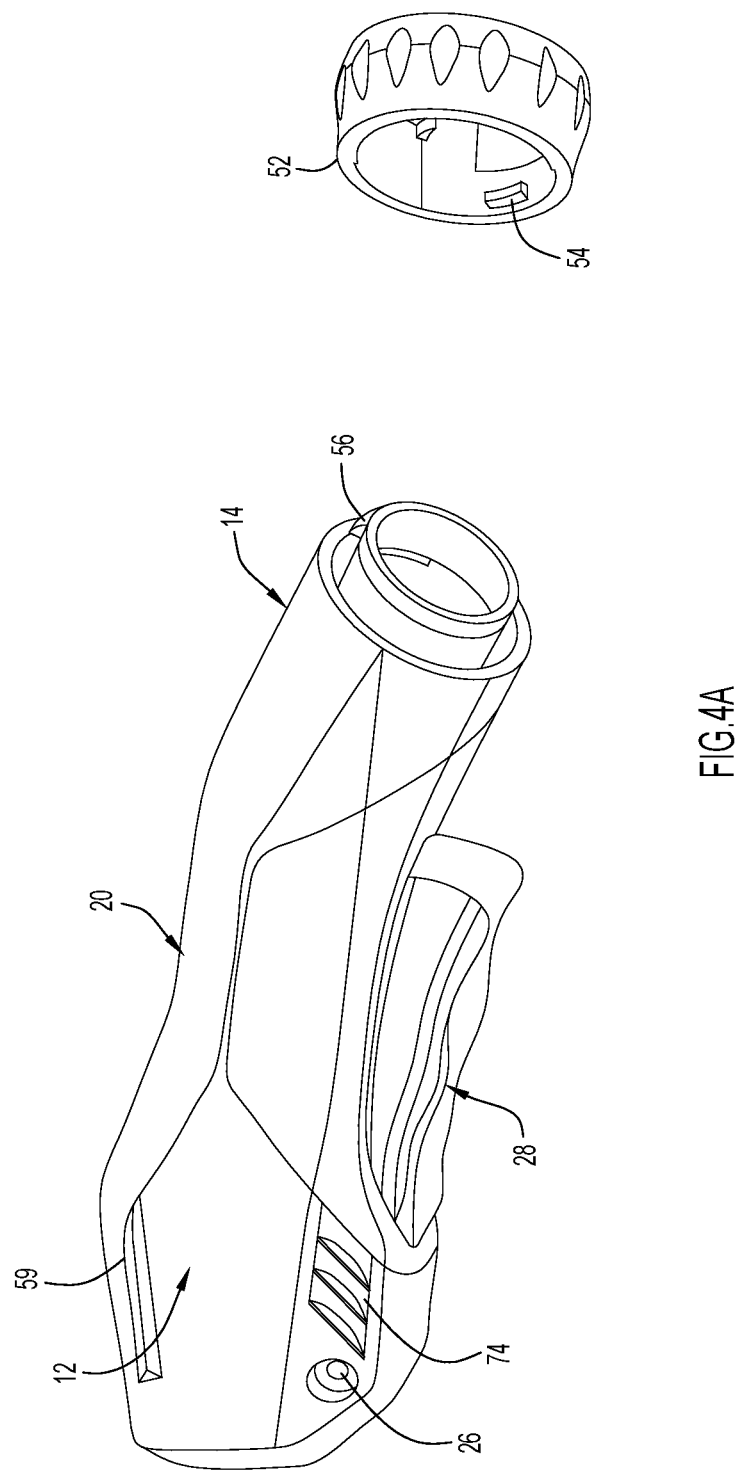
FIG. 4A is a side perspective view of the handle assembly and a locking ring constructed in accordance with the teachings of the present disclosure.
Figure 4C:
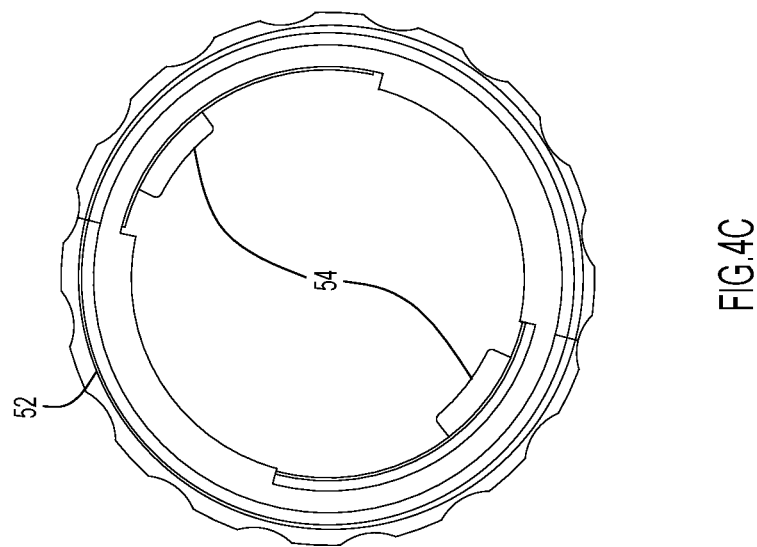
FIG. 4C is an end view of the locking ring constructed in accordance with the teachings of the present disclosure.
Figure 4B:
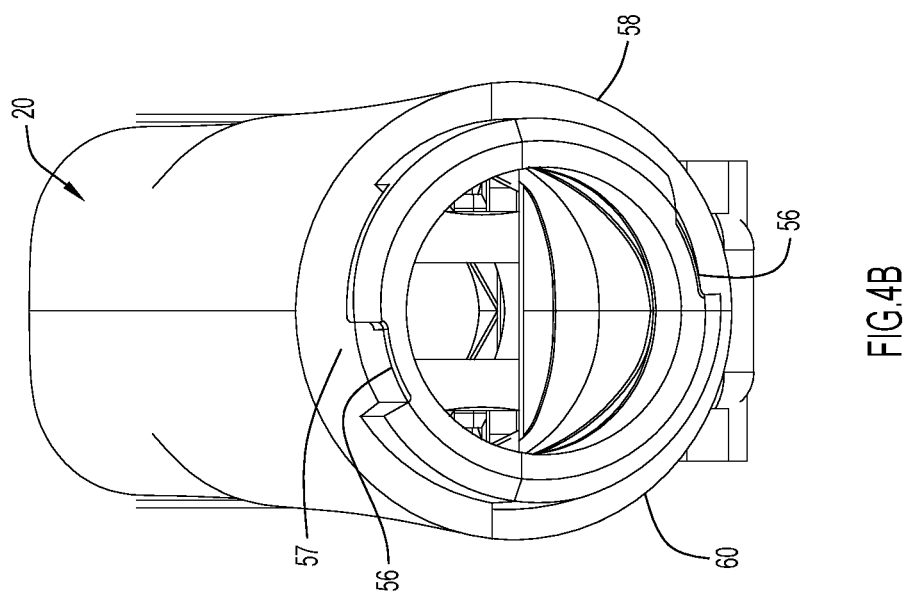
FIG. 4B is an end view of the handle assembly constructed in accordance with the teachings of the present disclosure.
Figure 4D:
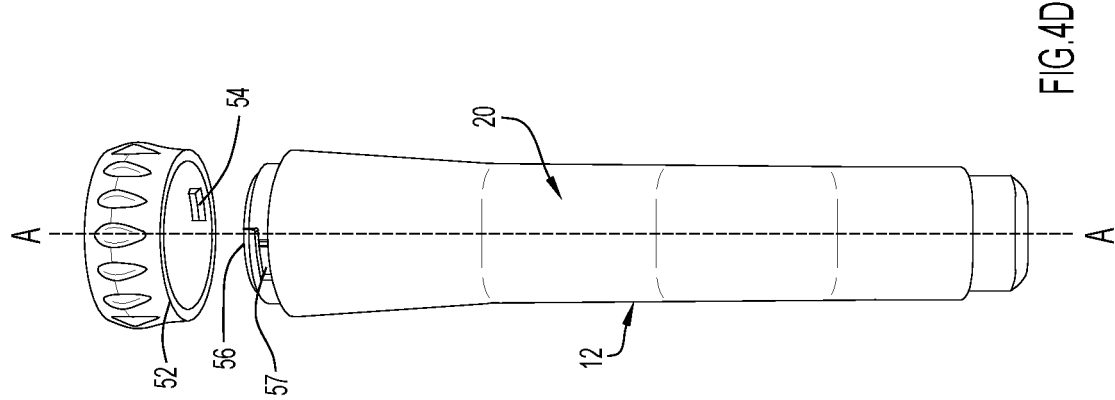
FIG. 4D is a rear perspective view of the handle assembly and a locking ring constructed in accordance with the teachings of the present disclosure.

Referring to FIGS. 1 and 2, a welding torch according to the present disclosure comprises a handle assembly 10. The handle assembly 10 includes a housing 12, which defines a proximal end portion 14, a distal end portion 16, and a surface 18. In one form, the surface 18 of the housing 12 extends between the end portions 14, 16 as shown. Advantageously, an interchangeable saddle 20 is removably secured to the surface 18 of the housing 12 for modifying a grip 22 of the handle assembly 10. In one form, the interchangeable saddle 20 is secured to the upper surface as shown, but it should be appreciated that the interchangeable saddle 20 may be secured to any surface of the housing 12 while remaining within the scope of the present disclosure. As a result, a variety of different interchangeable saddles 20 may be employed with a single welding torch as a function of the needs of an end-user and/or application, as described in greater detail below.

As further shown, a front cap 24 is secured to the distal end portion 16 of the housing 12. The front cap 24 provides support to the handle assembly 10. In one form, the front cap 24 is secured to the handle assembly 10 by a fastener 92 that extends through a fastening aperture 26 for securing the front cap 24 to the housing 12. In one form, a trigger assembly 28 is secured to the housing 12 and includes a pivot pin 90 for securing the trigger assembly 12 in the housing 12. The trigger assembly 28 is operatively connected to a gas and electrical supply (not shown). In another form, the trigger assembly may be replaced by a button and may be placed at various locations on the housing 12 or interchangeable saddle 20. The button may also be used in combination with the trigger assembly and the button may control various welding parameters, such as the gas flow or wire speed. A conductor tube 30 is connected to the distal end portion 14 of the handle assembly 10 and extends through a portion of the housing 12. A consumable assembly 32 is secured to a distal end of the conductor tube 30. The consumable assembly may include, by way of example, various welding consumables such as a contact tip 34, nozzle 36 and typically a gas diffuser.

A lead assembly 40 extends into the housing 12 from the proximal end portion 16 and connects to the conductor tube 30. The lead assembly 40 provides a conduit for the gas and electrical power through the proximal end portion 16 of the handle 12 and into the conductor tube 30. The trigger assembly 28 is secured to the handle 12 and operatively controls the supply of gas and electrical power through the welding torch. The lead assembly 40 is connected to a welding cable 42 that includes an end fitting 44 that provides a connection with the gas and power supply (not shown).

Referring to FIGS. 3A and 3B, the housing 12 and interchangeable saddle 20 are removably secured together via the housing 12 having at least one attachment feature 46 adjacent the distal end portion 16 of the housing 12, and at least one attachment feature 56 adjacent the proximal end portion 14. The interchangeable saddle 20 defines mating attachment features 48 configured to engage the attachment features 46 of the housing 12. In one form, the attachment feature 46 of the housing 12 comprises laterally offset rails 50, and the interchangeable saddle 20 includes a mating attachment feature 48 of an open slot that slides over the laterally offset rails 50. The offset rails 50 and the slot 48 are just one example of attachment features to secure the interchangeable saddle 20 to the distal end portion of the housing 12. It should further be appreciated that many different attachment features may be utilized for interchangeably securing the interchangeable saddle 20 to the housing 12 and that the offset rails 50 and slot 48 should not be construed as limiting the scope of the present disclosure.

As shown in FIGS. 4A, 4B, 4C and 4D, the housing 12 and the interchangeable saddle 20 are secured together at the proximal end portion 14 by a locking ring 52 in one form of the present disclosure. Each of the housing 12 and the interchangeable saddle 20 define a receiving groove 56 that first extends axially along the longitudinal axis A of the handle assembly 10 and then radially and partially around as shown. Advantageously, in one form, the housing defines a vent 59 between the interchangeable saddle 20 and housing 12.

The locking ring 52 defines at least two tabs 54 for engaging the receiving grooves 56 in each of the housing 12 and the interchangeable saddle 20. For installation of the locking ring 52, the tabs 54 of the locking ring 52 are first aligned and axially engaged within the receiving grooves 56 until the tabs 54 abut end walls 57 of each of the housing 12 and interchangeable saddle 20. Then, the locking ring 52 is rotated clockwise and the tabs 54 enter the radial portions of the receiving grooves 56. The receiving grooves 56 may further include stops, such as a protrusion (not shown), or other feature to provide haptic feedback that the locking ring 52 is properly engaged with the housing 12 and interchangeable saddle 20. Accordingly, the locking ring 52 secures the handle assembly 10 together by interlocking the housing 12 and the interchangeable saddle 20 at the proximal end portion 14. The locking ring 52 and receiving grooves 56 are just one example of a contemplated manner to secure the components of the handle assembly 10 together. Other forms of securing the components of the handle assembly 10 may be employed, such as by way of example, threads, snap-fit, and interference fit, among other designs, while remaining within the scope of the present disclosure.

The locking ring 52 may also include an exterior surface that has a texture as shown to provide an improved gripping surface for a user to rotate the locking ring 52 without the use of a tool. Alternately, the exterior surface of the locking ring 52 may include various shapes and textures to provide a desired interface, such as by way of example, a hexagonal shape that can be engaged by a tool or wrench.

Figure 5A:
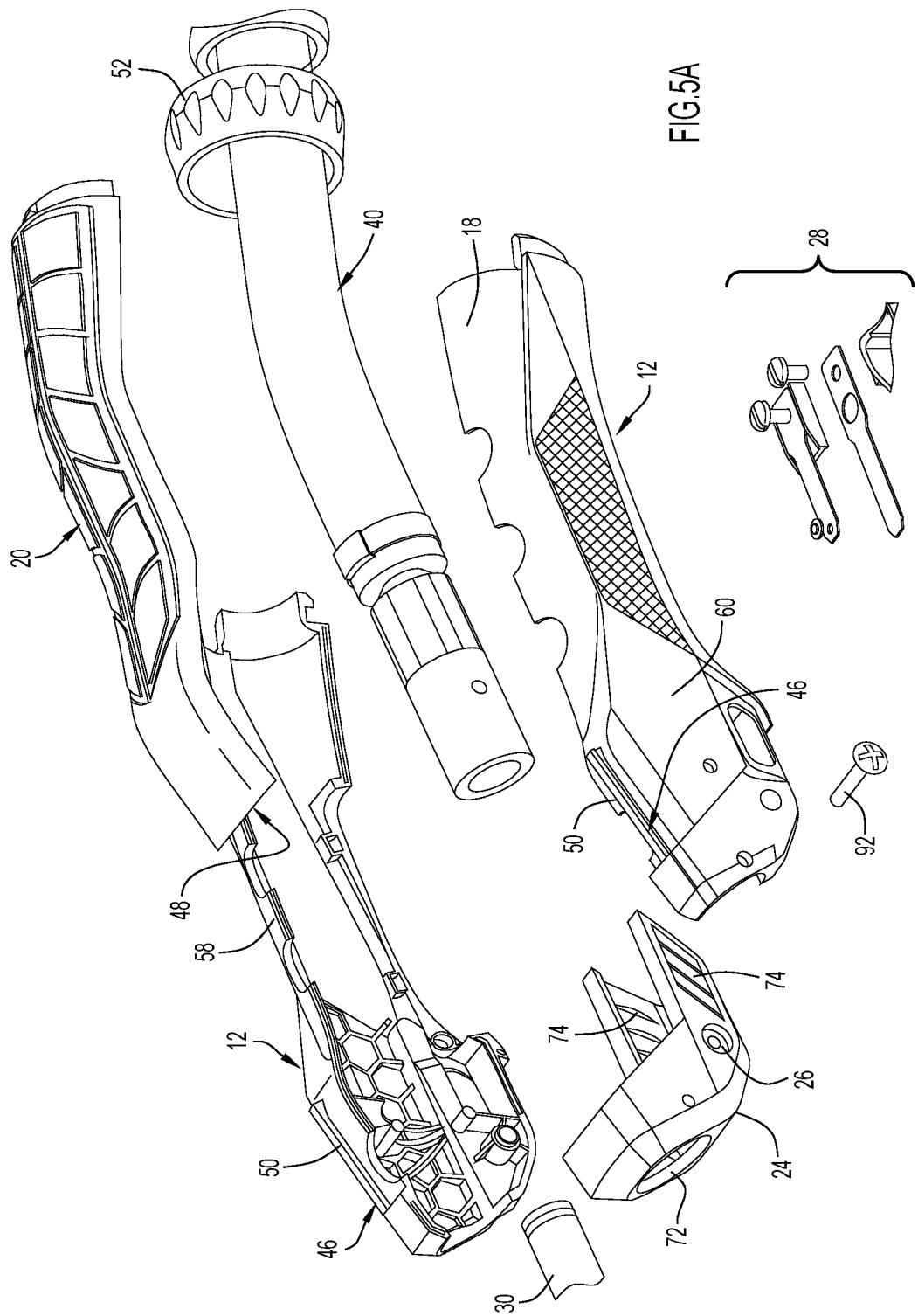
FIG. 5A is an exploded perspective view of another form of the handle assembly constructed in accordance with the teachings of the present disclosure.
Figure 5B:
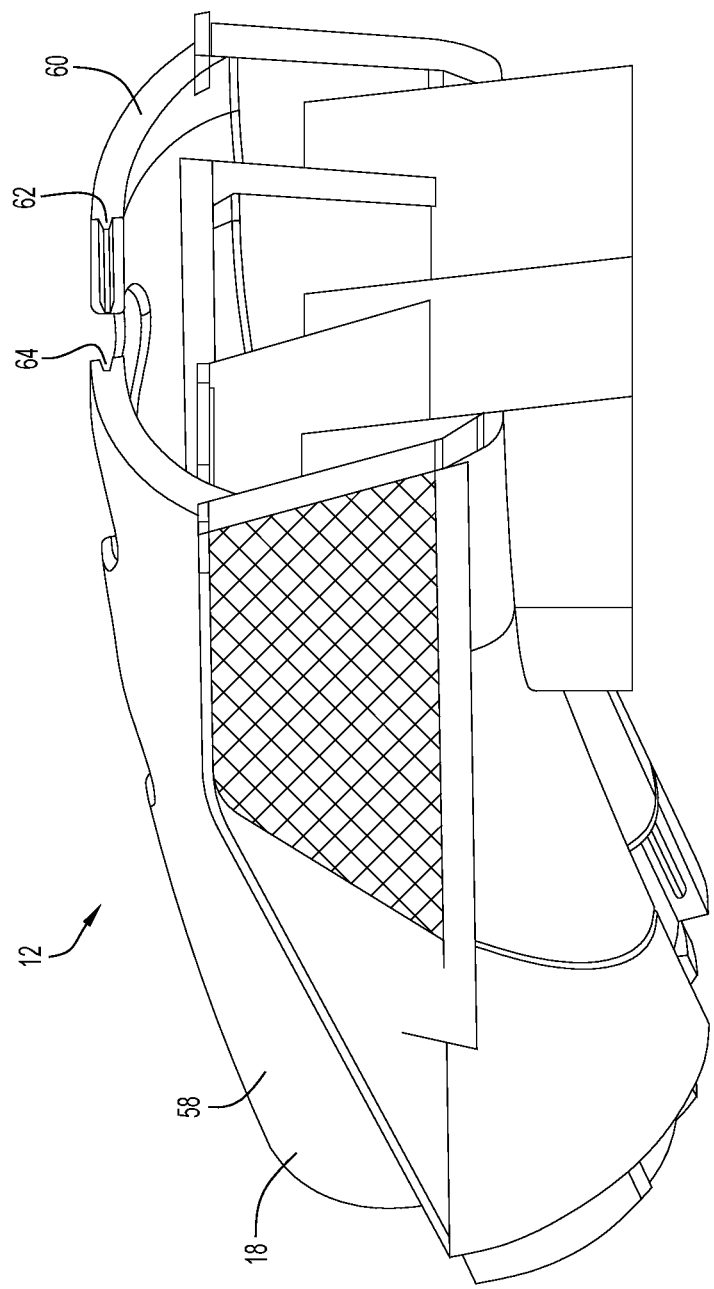
FIG. 5B is a partial exploded view of the handle assembly illustrating an engagement between a first housing half with the second housing half and constructed in accordance with the teachings of the present disclosure.

Referring to FIGS. 5 and 5A, the handle assembly 10 in another form of the present disclosure may comprise of a plurality of housing members 58, 60 that may interlock to form the housing 12. In this form, the housing 12 comprises a first housing half 58 and a second housing half 60. The housing halves are removably secured by a tongue 62 and a groove 64 type connection as shown. However, it should be further appreciated that other connections between the housing members may be employed while remaining within the scope of the present disclosure, and thus the example of a tongue and groove connection should not be construed as limiting the scope of the present disclosure. Additionally, the housing members 58,60 need not be in "halfs" as described and illustrated herein, and thus may be in any number and size/proportion of the entire housing 12 while remaining within the scope of the present disclosure.

Figure 6B:
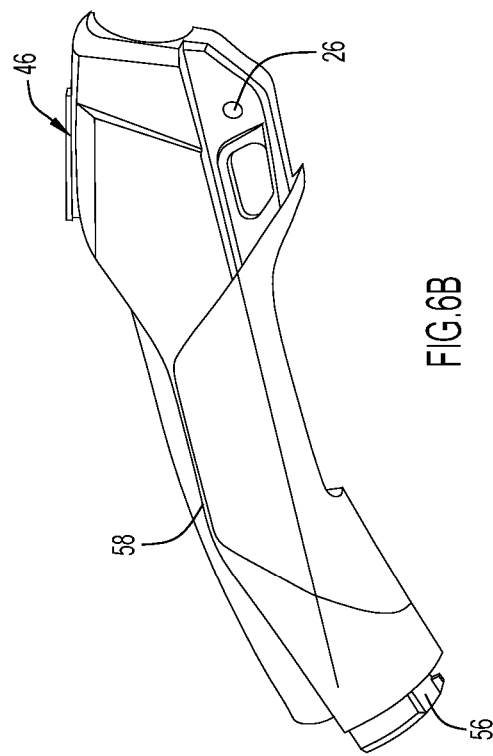
FIG. 6B is another side view of the first housing half of the another form of the handle assembly constructed in accordance with the teachings of the present disclosure
Figure 6A:
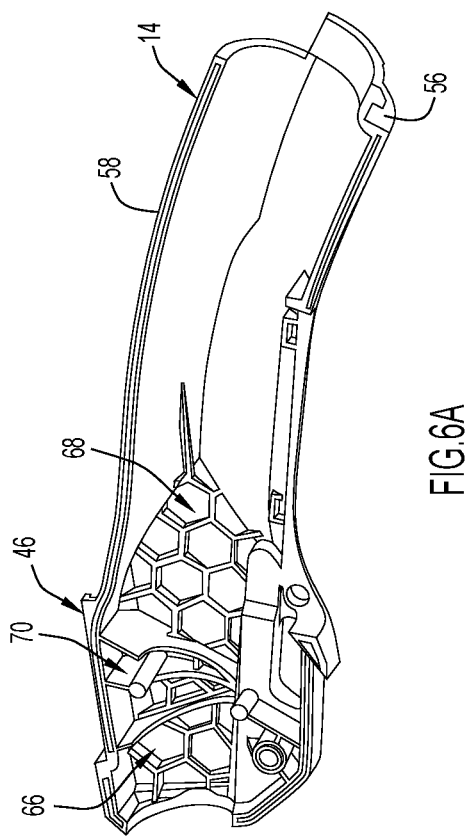
FIG. 6A is a side view of a first housing half of the another form of the handle assembly constructed in accordance with the teachings of the present disclosure

Referring to FIGS. 6A and 6B, the first and second halves 58, 60 each define a distal interior side wall portion 66. The distal interior side wall portion 66 may optionally include a series of reinforcement members 68. The reinforcement members 68 are designed to strengthen the side wall portions 66 and add rigidity to the housing 12 and the handle assembly 10. As shown in FIG. 6A, the reinforcement members 68 are further shown to define a honeycomb configuration. The honeycomb configuration is merely exemplary and thus various reinforcement geometries such as longitudinal ridges or truss members may be employed while remaining within the scope of the present disclosure.

Figure 7:
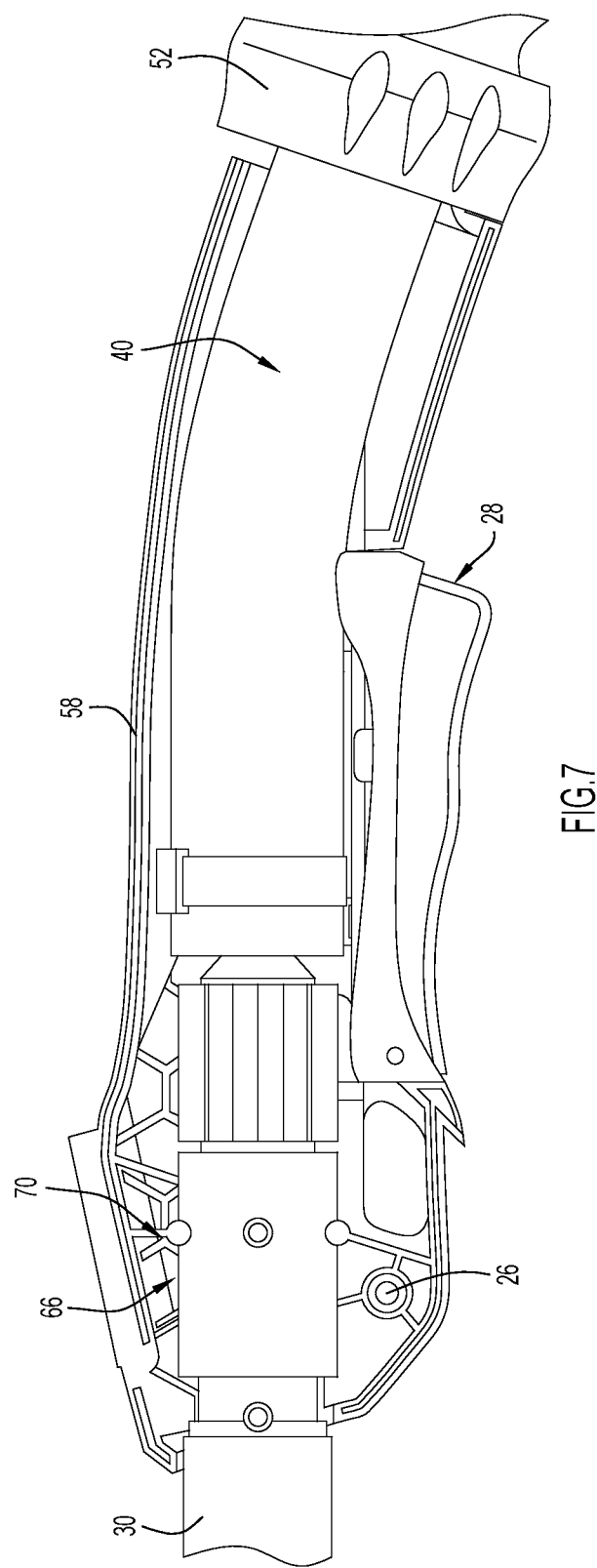
FIG. 7 is partial side view of the another form of the handle assembly constructed in accordance with the teachings of the present disclosure
Figure 8A:
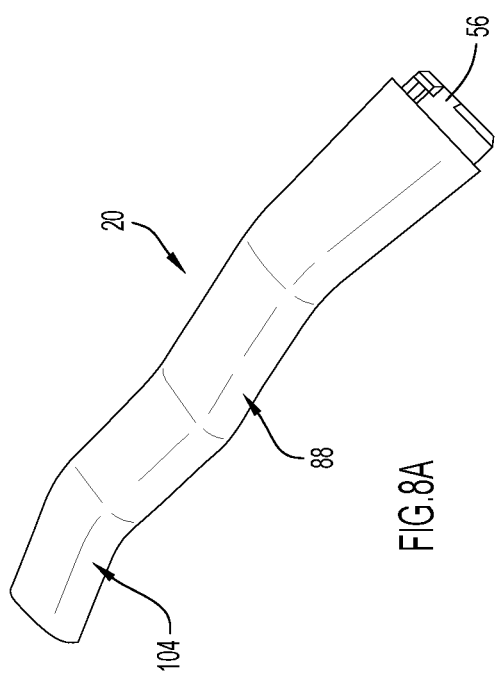
FIG. 8A is a perspective view of an interchangeable saddle constructed in accordance with the teachings of the present disclosure.
Figure 8B:
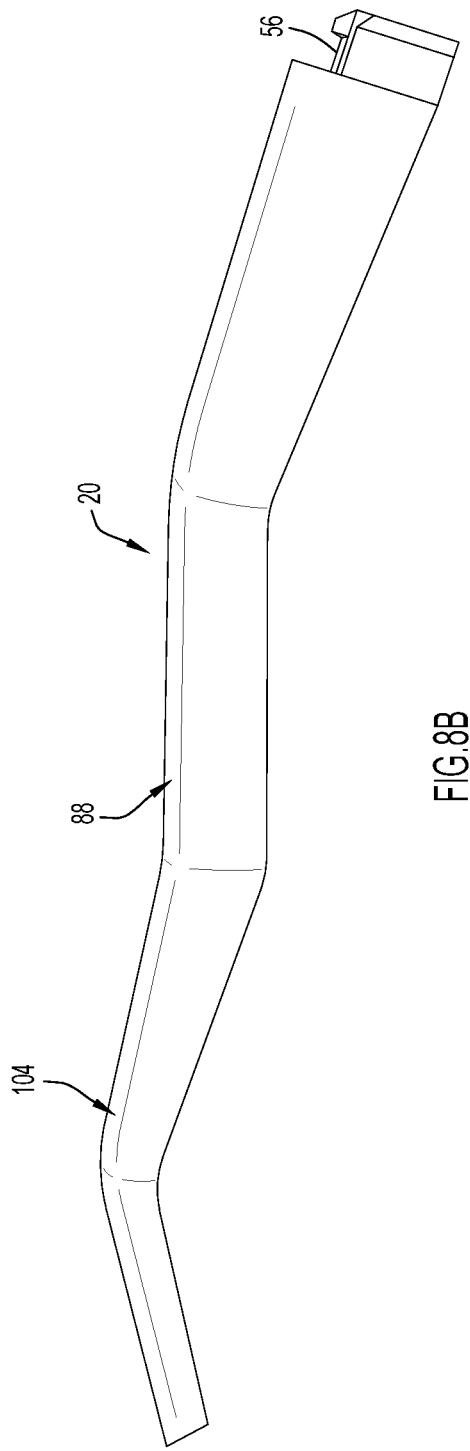
FIG. 8B is a side view of the interchangeable saddle of FIG. 8A.
Figure 8D:
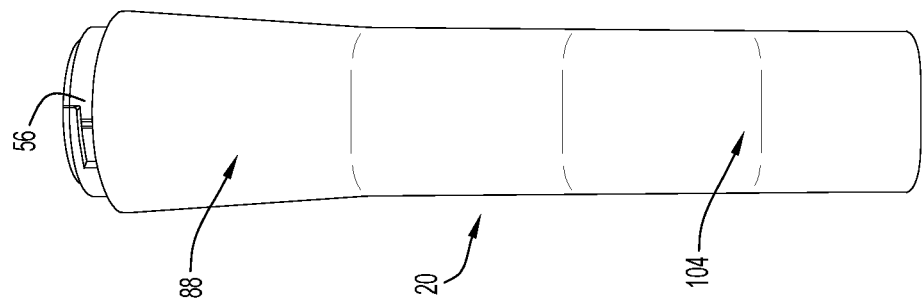
FIG. 8D is a top view of the interchangeable saddle of FIG. 8A.
Figure 8C:
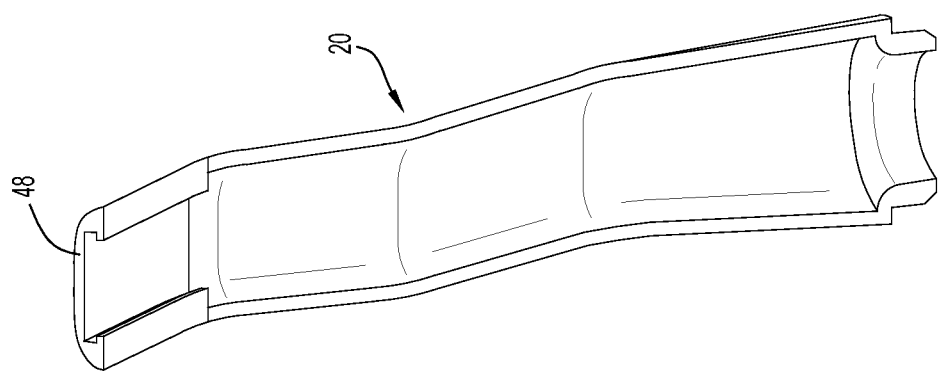
FIG. 8C is a bottom view of the interchangeable saddle of FIG. 8A.

Referring to FIGS. 6A and 7 the distal interior side wall portions 66 of the housing members 58, 60 each define a series of ridges 70 for engaging the internal components of the welding gun in another form of the present disclosure. As best shown in FIG. 7, the lead assembly 40 and conductor tube 30 are secured within the housing 12 by the series of ridges. As shown in FIG. 5, the housing members 58,60 further surround the lead assembly 40 and clamp the lead assembly 40 within the series of ridges between the housing members 58, 60 of the housing 12. It should be appreciated that the series of ridges 70 may be scaled or designed to engage with a variety of internal components and in a wide application of torches and guns for various metal working. The illustrated example is only one application of the present disclosure, and should not be construed as limiting the scope of the present disclosure.

Still referring to FIG. 5A, and also to FIG. 3A, the handle assembly 10 includes the front cap 24 that is secured to the distal end portion 16 of the housing 12. The front cap 24 includes an opening 72 to allow the conductor tube 30 to pass and enter into the handle assembly 10. The front cap 24 optionally includes at least one vent 74 to allow air flow to flow through the housing 12 of the handle assembly 10 in order to cool its internal components. The front cap 24 may further include multiple vents 74 to increase air flow through the handle assembly 10. In another form, the front cap includes vents 74 on opposing side of the front cap 24 as shown. However, the vents 74 in the front cap 24 are only one example of features that may be employed to dissipate the heat generated within the welding torch. The housing 12 and handle assembly 10 may include additional openings/vents to allow for the dissipation of the heat generated within the welding torch, as set forth in greater detail below, and thus the forms illustrated and described herein should not be construed as limiting the scope of the present disclosure.

In other forms of the present disclosure, the front cap 24 is interchangeable and may include optional accessories such as a heat shield, an auxiliary grip, a hangar, or electronic controls, among other accessories, while remaining within the scope of the present disclosure.

Referring to FIGS. 8A, 8B, 8C and 8D, in one form, the interchangeable saddle 20 comprises at least one mating attachment feature 48. The mating attachment feature 48 is configured to engage a corresponding attachment feature of the handle assembly 10. The interchangeable saddle 20 defines a customized geometrical grip 88 as shown, which is specifically designed for a particular end-user/application as described in greater detail below. The interchangeable saddle 20 may further define various geometrical grips 88. Each geometrical grip 88 may include changes to any combination of a shape, size, texture, surface elevation or other surface features of the interchangeable saddle. The interchangeable saddle 20 can be easily changed by the user to customize the grip of the handle assembly 10 with the interchangeable saddle 20 incorporating the desired geometrical grip 88. The interchangeable saddle 20 can be further designed for a user to improve the ergonomics and reduce stress on the user's hand during operation.

Now referring to FIG. 9 and FIGS. 10A, 10B, 10C and 10D the interchangeable saddle 20 may define various customized geometrical grips. For example the interchangeable saddle 20 may define a smooth outer surface 78. In another form of the interchangeable saddle 20', a textured outer surface 80 may be employed to improve and/or alter the grip to a specific end-user and their desired grip. The texture 80 can be of various designs and customized to the application and may also include product branding/marking and/or colors, among other surface indicia. The interchangeable saddle 20 may use various colors to indicate a specific set-up or configuration of the welding torch. For example, a red saddle may be used to indicate a welding torch configured with a contact tip and nozzle assembly for a heavy-duty rating. It should be understood that other visual indications on the saddle may be employed to more clearly indicate to the configuration of the welding torch and/or user preferences.

The present disclosure further provides a set 86 of interchangeable saddles 20, 20', 20" for a handle assembly 10, which is best shown in FIG. 9. Each interchangeable saddle 20, 20', 20" of the set 86 would incorporate at least one mating attachment feature 48. As discussed above, the attachment feature 48 engages a corresponding attachment feature 46 of the handle assembly 10. Each of the interchangeable saddles 20, 20', and 20" defines a customized geometrical grip 88 as shown. The set 86 of interchangeable saddles 20, 20', 20" would allow the user to quickly and efficiently change the type of grip being used. For example, the illustrated forms of the interchangeable saddles 20, 20', 20" in each set 86 has the smooth outer surface 78, the textured outer surface 80, and a surface 82 that forms an internal channel as described in greater detail below. The illustrated surface textures and shapes of the saddle 20 as used herein are merely exemplary and should not be construed as limiting the scope of the present disclosure. It should be understood that any number and configurations of interchangeable saddles may be employed while remaining within the scope of the present disclosure.

Figure 10A:
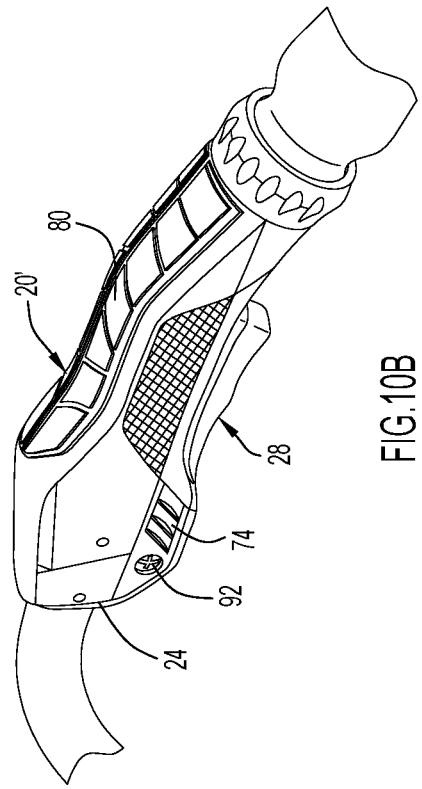
FIG. 10A is a partial perspective view of a welding torch utilizing an interchangeable saddle constructed in accordance with the teachings of the present disclosure.
Figure 10B:
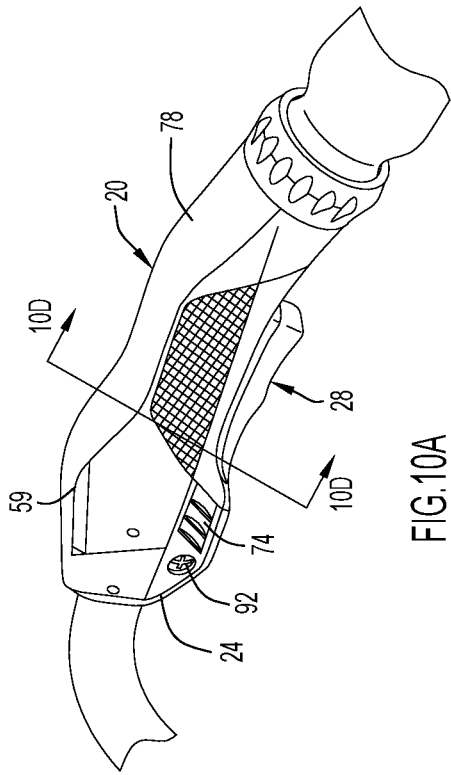
FIG. 10B is a partial perspective view of the welding torch utilizing another interchangeable saddle constructed in accordance with the teachings of the present disclosure.
Figure 10C:
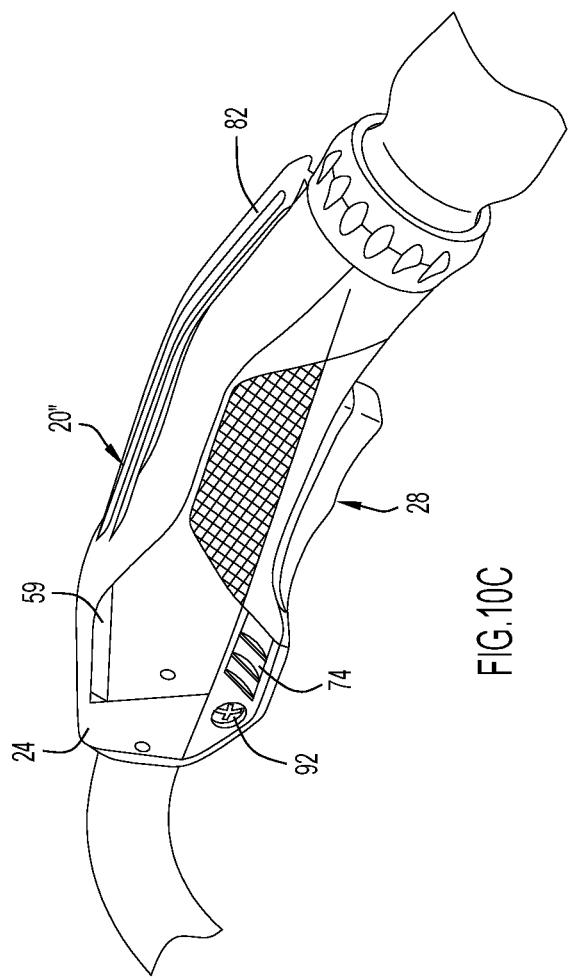
FIG. 10C is a partial perspective view of the welding torch utilizing still another interchangeable saddle constructed in accordance with the teachings of the present disclosure.
Figure 10D:
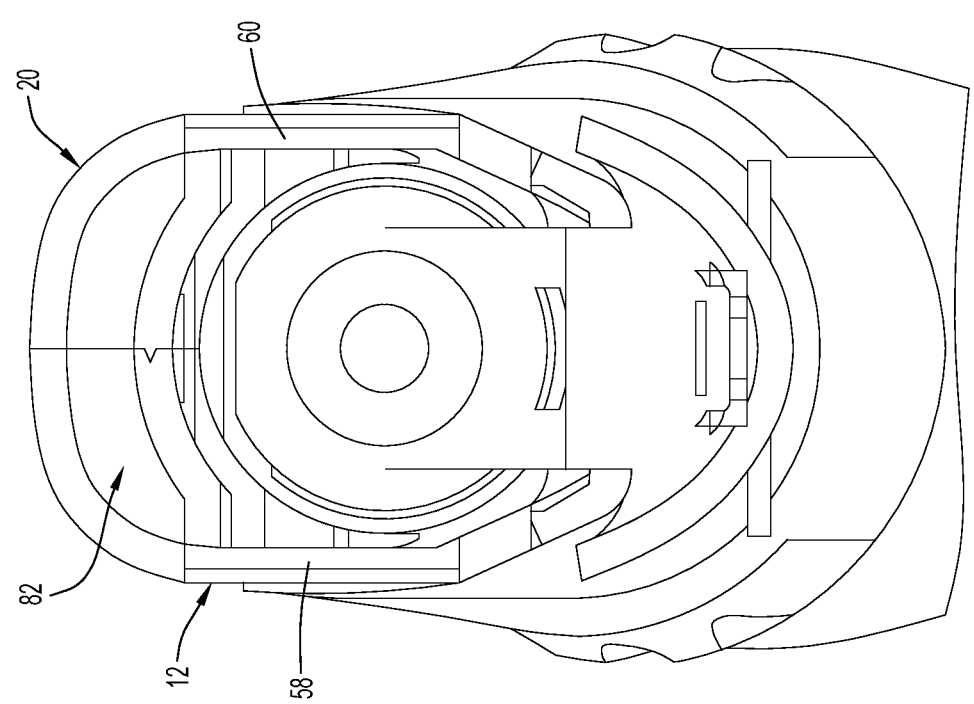
FIG. 10D is a cross-sectional view taken at line 10D-10D in FIG. 10A.

The interchangeable saddle 20 can also be employed to further modify the overall exterior shape of the handle assembly 10. For example, such a shape may include a generally rectangular cross-sectional shape to create a grip that may prevent the handle assembly from being able to easily rotate within the user's hand while in operation. In FIG. 10D, the interchangeable saddle 20 provides an added height to housing 12 to create a more rectangular cross-section to provide the user with a "hockey stick" like cross-section to prevent the rotation of the handle within the user's hand. In another form, the interchangeable saddle 20 may be made of a material to vary the hardness or durometer of the saddle 20. The saddle 20 may incorporate vibration dampers, such as a gel material or various other materials that would reduce the transmission of vibration to a user's hand.

Figure 10E:
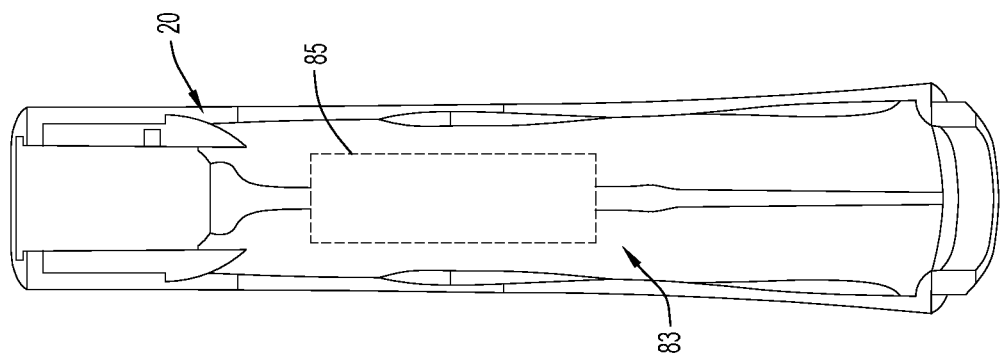
FIG. 10E is a bottom view of another form of an interchangeable saddle constructed in accordance with the teachings of the present disclosure.

As shown in FIGS. 10D and 10E, an internal channel 82 is defined between the interchangeable saddle 20 and the housing 12 in one form of the present disclosure. The internal channel 82 is provided for additional cooling and may further incorporate various active and/or passive cooling features, among other devices. For example the saddle may include a radiant barrier on an inside surface 83 of the interchangeable saddle to reduce the temperature of the geometrical grip 88. The radiant barrier may include various reflective materials and heat resistant materials and may be a coating on the inside surface 83. The radiant barrier may be located on the inside surface 83 of the interchangeable saddle 20. In another form, the cooling may be provided using the Peltier Effect or a thermoelectric cooling device 85 secured to the interchangeable saddle and located within the internal channel 82 and secured to the inside surface 83 of the interchangeable saddle 22. In another form, the internal channel 82 may enclose anti-vibrational dampers, such as a gel pack to further modify the feel of the geometrical grip 88. In additional forms of the present disclosure, the interchangeable saddle 20 may include various sensors, such as accelerometers to provide feedback of the orientation, position, and movement, among others, of the torch to a computer, or controller (not shown). In other forms, additional sensors or feedback devices may further be enclosed within the internal channel 82.

The interchangeable saddle 20" may further include a raised portion 81 (FIG. 9) that may further change the shape of the internal channel 82 for improving the cooling or modifying the airflow through the handle assembly 10. The internal channel 82 provides additional height to the internal channel 82 and a conduit for air flow to cool the handle assembly 10 and its internal components. The housing 12 may optionally include apertures 84 to provide air flow into and out of the housing 12 for improved cooling. The apertures 84 may also provide a conduit for additional airflow into the internal channel 82 of the interchangeable saddle 20.

It is also contemplated that the illustrated and described interchangeable saddles 20 may include various outer surfaces, channels and profiles, among other features, to further customize a geometrical grip and provide tailored functionality during operation of the torch. Accordingly, the forms illustrated and described herein should not be construed as limiting the scope of the present disclosure.

Figure 12:
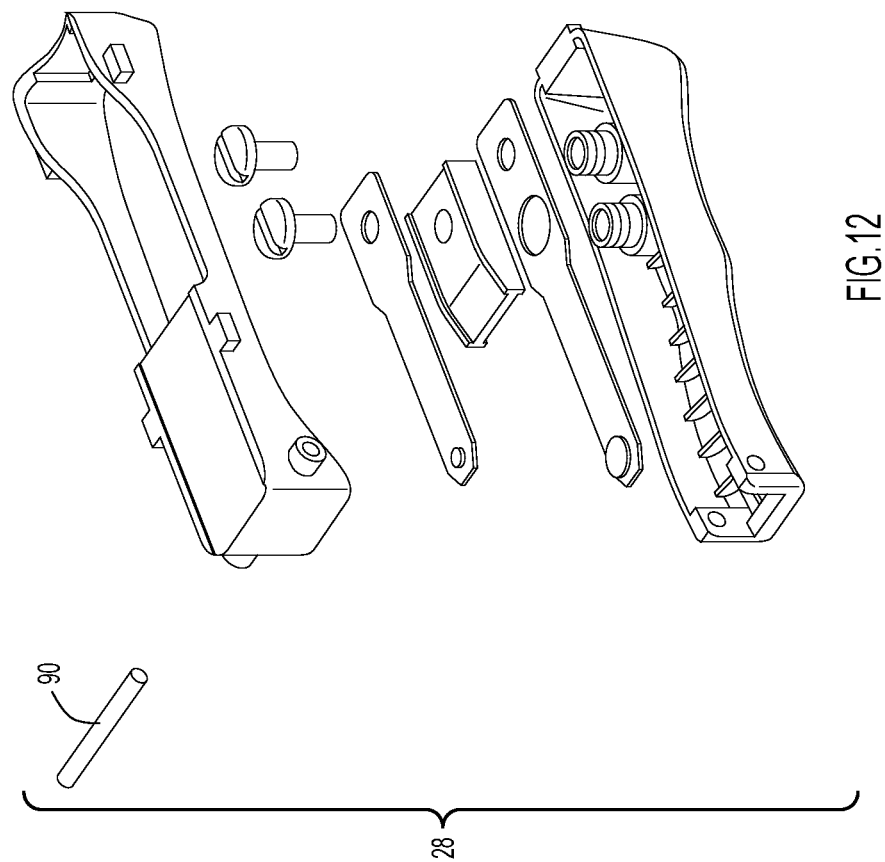
FIG. 12 is an exploded perspective view of the trigger assembly of FIG. 11.
Figure 11:
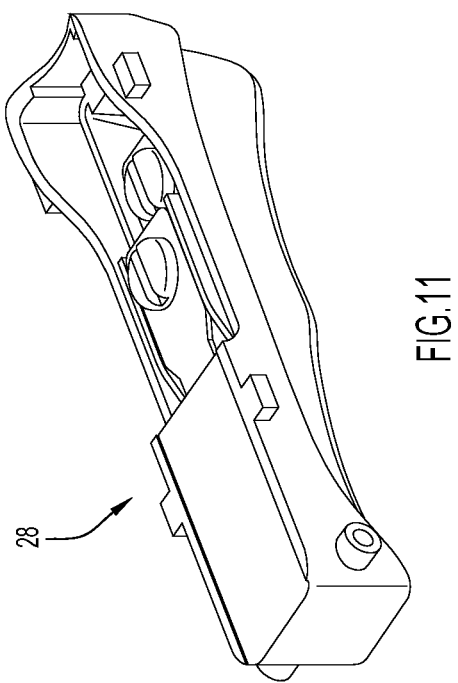
FIG. 11 is a perspective view of a trigger assembly constructed in accordance with the teachings of the present disclosure.

Referring to FIGS. 11 and 12, the handle assembly further includes a trigger assembly 28. The trigger assembly 28 in one form is secured to the housing 12 via a pin 90. In the illustrated form, the trigger assembly is located on the bottom of the handle assembly 10; however, it should be appreciated that the trigger assembly may be located in various other positions along the housing while remaining within the scope of the present disclosure.

Figure 13:
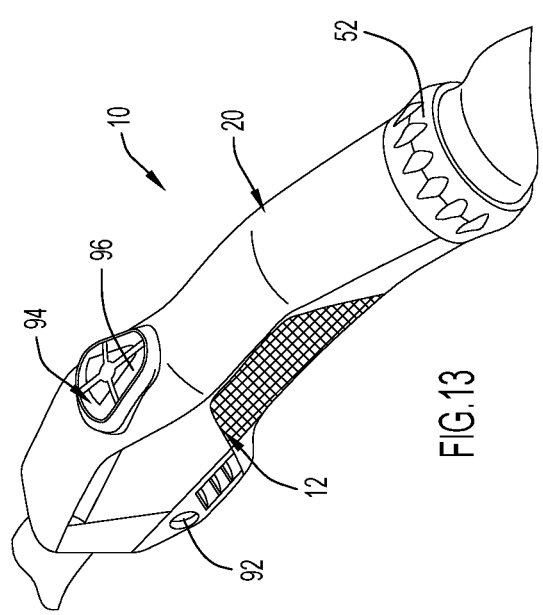
FIG. 13 is a partial perspective view of the handle assembly utilizing another form of an interchangeable saddle constructed in accordance with the teachings of the present disclosure.
Figure 14:
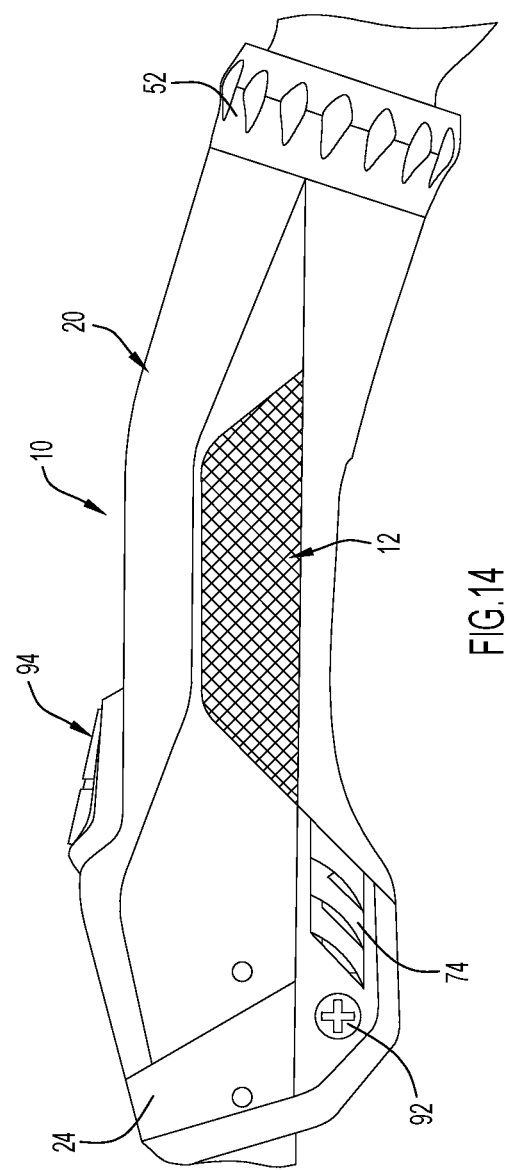
FIG. 14 is a side view of the interchangeable saddle of FIG. 13.
Figure 15:
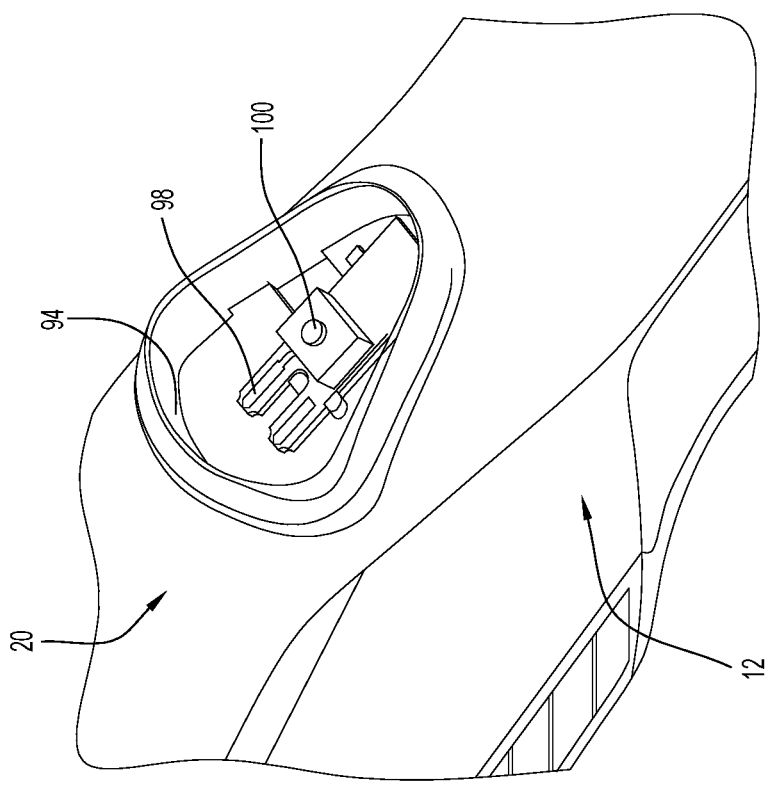
FIG. 15 is a partial perspective view of an electronics chamber of the interchangeable saddle of FIG. 13.

Referring now to FIGS. 13-15, another form of the interchangeable saddle 20 may further define an electronics chamber 94, which in this form is adjacent the distal end portion 16, for housing electrical control components. The electrical control components may allow the user to control various welding parameters. Such welding parameters may include the gas and electrical supply to the gun or control parameters for the welding torch. The interchangeable saddle 20 optionally includes a flexible cover 96 to cover the chamber 94 and protect the electrical components. Since the cover is flexible, the user is able to manipulate electrical components within the electrical chamber to control the various welding parameters. The electronics chamber 94 may contain a circuit board 98 with a switch 100 to activate and control the various welding parameters by the user from the handle assembly 10.

Figure 16:
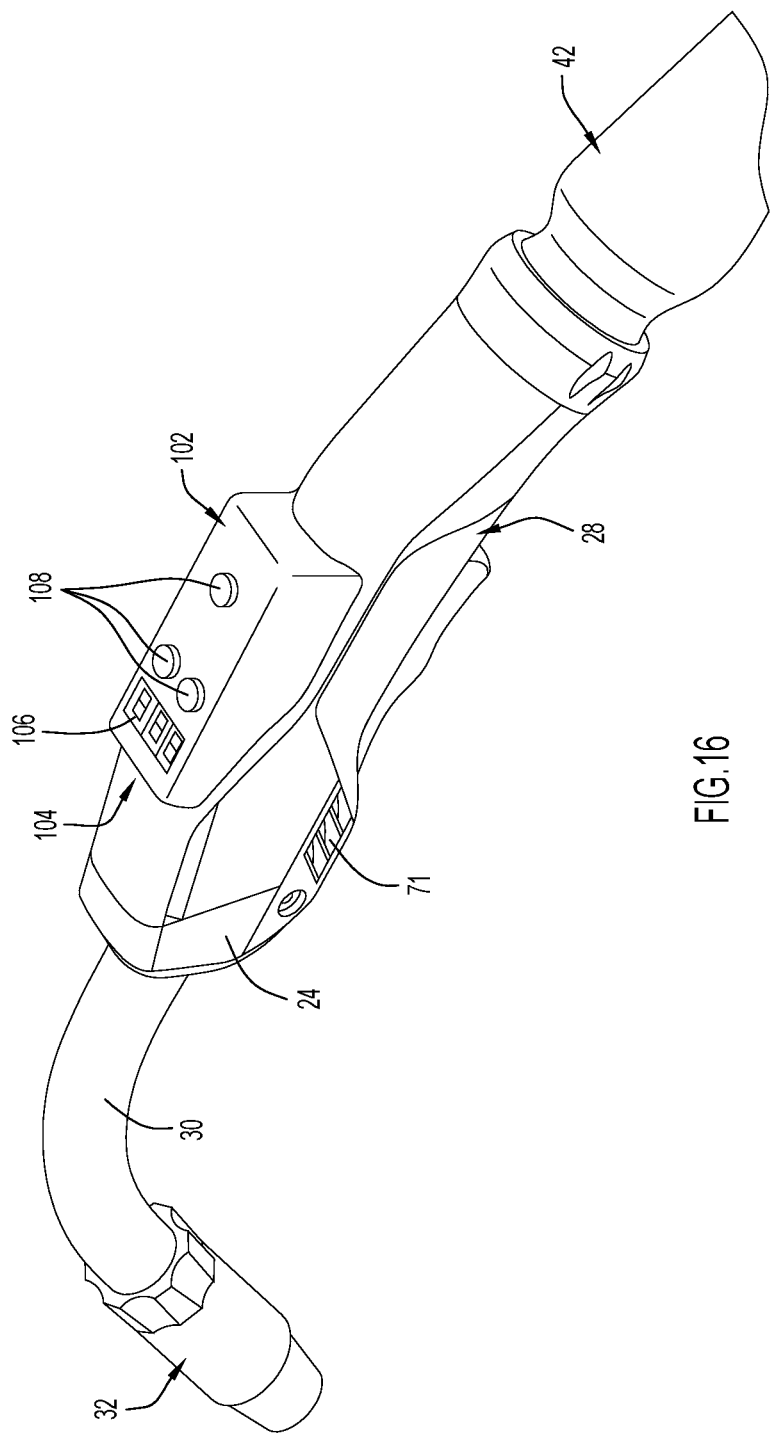
FIG. 16 is a perspective view of yet another interchangeable saddle with a control module constructed in accordance with the teachings of the present disclosure.

Referring to FIG. 16, the interchangeable saddle 20 may further include a control module 102. The control module 102 extends from an upper distal surface 104 of the interchangeable saddle 20 in this form of the present disclosure. The control module 102 may allow the user to view various inputs/outputs of the welding system through at least one display 106. The user may further adjust at least one welding parameter or control system variables via at least one input 108 located on the control module 102. It is further contemplated that the control module 102 may further define a display and utilize a touch screen or various graphical interfaces as the input to allow the user to further control various welding parameters of the system.

The previous examples are not suggested to limit other variations and are presented to teach possible embodiments of this disclosure.

The present disclosure is merely exemplary in nature and, thus, variations that do not depart from the spirit of the disclosure are intended to be within the scope of the present disclosure. Such variations are not to be regarded as a departure from the scope contemplated in the present disclosure.

What is claimed is:

1. A handle assembly for a welding torch comprising:
 a housing defining a proximal end portion, a distal end portion, and a surface extending between the proximal end portion and the distal end portion, the proximal end portion defining at least one first attachment feature;
 an interchangeable saddle removably secured to the surface of the housing for modifying a grip of the handle assembly, a proximal end portion of the interchangeable saddle defining at least one second attachment feature; and
 a locking ring that defines at least two mating features that engage both the at least one first attachment feature of the housing and the at least one second attachment feature of the interchangeable saddle upon rotation of the locking ring, so that rotation of the locking ring secures the interchangeable saddle to the housing.

2. The handle assembly according to claim 1, wherein:
 the housing further defines at least one third attachment feature adjacent the distal end portion of the housing; and
 a distal end portion of the interchangeable saddle defines at least one mating attachment feature configured to engage the at least one third attachment feature of the housing.

3. The handle assembly according to claim 2, wherein the at least one third attachment feature of the housing comprises laterally offset rails, and the at least one mating attachment feature of the interchangeable saddle comprises an open slot that engages the laterally offset rails.

4. The handle assembly according to claim 1, wherein:
 the at least one first attachment feature of the housing and the at least one second attachment feature of the interchangeable saddle each comprise at least one receiving groove extending axially and radially; and
 the at least two mating features of the handle assembly comprise at least two tabs for engaging the at least one receiving groove of the housing and the interchangeable saddle.

5. The handle assembly according to claim 1, wherein the housing comprises a plurality of housing members.

6. The handle assembly according to claim 5, wherein the plurality of housing members comprises a first housing half and a second housing half.

7. The handle assembly according to claim 5, wherein at least one of the housing members define a distal interior side wall portion defining a series of reinforcement members.

8. The handle assembly according to claim 7, wherein the series of reinforcement members define a honeycomb configuration.

9. The handle assembly according to claim 7, wherein the distal interior side wall portion of each housing member further defines a series of ridges for engaging internal components of the welding torch.

10. The handle assembly according to claim 5, wherein the plurality of housing members are removably secured by a tongue and groove connection.

11. The handle assembly according to claim 1, wherein the housing defines at least one vent.

12. The handle assembly according to claim 1, further comprises a front cap secured to the distal end portion of the housing.

13. The handle assembly according to claim 12, wherein the front cap defines at least one vent.

14. The handle assembly according to claim 12, wherein the front cap defines at least one vent on opposed sides of the front cap.

15. The handle assembly according to claim 1, wherein the interchangeable saddle further defines a smooth outer surface.

16. The handle assembly according to claim 1, wherein the interchangeable saddle further defines an outer surface, and at least a portion of the outer surface is textured.

17. The handle assembly according to claim 1, wherein the interchangeable saddle defines an internal channel for dissipation of heat generated by the welding torch.

18. The handle assembly according to claim 1, wherein the interchangeable saddle defines an outer surface defining an electronics chamber containing electrical control components.

19. The handle assembly according to claim 18, wherein the electrical control components further comprise:
 a circuit board and switch disposed within the electronics chamber; and
 a flexible cover over the electronics chamber for allowing activation of the switch within the electronics chamber.

20. The handle assembly according to claim 1, wherein the interchangeable saddle further defines a control module extending from an upper distal surface thereof, and the control module includes at least one display and at least one input.

21. An interchangeable saddle for a torch comprising:
 a distal end portion;
 a proximal end portion that defines an attachment feature, the proximal end portion configured to align with a proximal end portion of a handle of a welding torch that includes a corresponding attachment feature so that a lock ring with at least two mating features can be rotated onto both the attachment feature of the proximal end portion of the interchangeable saddle and the corresponding attachment feature of the handle to secure the proximal end portion of the interchangeable saddle to the proximal end portion of the handle; and
 a customized geometrical grip.

22. A set of interchangeable saddles for a torch comprising, each saddle comprising:

a distal end portion;

a proximal end portion that defines at least one attachment feature, the proximal end portion configured to align with a proximal end portion of a handle of a welding gun that includes a corresponding attachment feature so that a lock ring with at least two mating features can be rotated onto both the at least one attachment feature of the proximal end portion of the saddle and the corresponding attachment feature of the handle to secure the proximal end portion of each saddle to the proximal end portion of the handle; and, a customized geometrical grip.

23. A welding torch comprising:

a handle assembly comprising:

a housing defining a proximal end portion, a distal end portion, and a upper surface extending between the proximal end portion and the distal end portion, the proximal end portion defining at least one first attachment feature;

an interchangeable saddle removably secured to the upper surface of the housing for modifying a grip of the handle assembly, a proximal end portion of the interchangeable saddle defining at least one second attachment feature; and a locking ring that defines at least two mating features that engage both the at least one first attachment feature of the housing and the at least one second attachment feature of the interchangeable saddle upon rotation of the locking ring, so that rotation of the locking ring secures the interchangeable saddle to the housing;

a conductor tube extending through the housing;

a trigger secured to the housing and operatively connected to a gas and electrical power supply; and a lead assembly secured to the conductor tube, the lead assembly providing a conduit for the gas and electrical power.

* * * * *